United States Patent
Naniyat et al.

(10) Patent No.: US 9,843,889 B2
(45) Date of Patent: *Dec. 12, 2017

(54) METHOD AND SYSTEM FOR MANAGING MULTIPLE APPLICATIONS IN NEAR FIELD COMMUNICATION

(71) Applicant: Samsung Electronics Co., Ltd., Gyeonggi-do (KR)

(72) Inventors: Arun Naniyat, Bangalore (IN); Thenmozhi Arunan, Bangalore (IN); Eun-Tae Won, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/229,233

(22) Filed: Mar. 28, 2014

(65) Prior Publication Data

US 2014/0273839 A1    Sep. 18, 2014

Related U.S. Application Data

(63) Continuation of application No. 13/055,045, filed as application No. PCT/KR2009/003957 on Jul. 17, 2009, now Pat. No. 9,020,423.

(30) Foreign Application Priority Data

Jul. 20, 2008    (IN) .......................... 1760/CHE/2008

(51) Int. Cl.
*H04B 7/00*    (2006.01)
*H04W 4/00*    (2009.01)
(Continued)

(52) U.S. Cl.
CPC .......... *H04W 4/008* (2013.01); *G06K 7/0008* (2013.01); *G06K 7/10237* (2013.01); *H04W 8/005* (2013.01)

(58) Field of Classification Search
CPC ................................ H04L 45/54; H04L 45/00
See application file for complete search history.

(56) References Cited

U.S. PATENT DOCUMENTS 7,151,764 B1    12/2006 Heinonen et al.
7,286,796 B2    10/2007 Izumi
(Continued)

FOREIGN PATENT DOCUMENTS

CN    101145190    3/2008
CN    101147387    3/2008
(Continued)

OTHER PUBLICATIONS

Smart Card Alliance: "A Smart Card Alliance Mobile & NFC Council White Paper—Host Card Emulation (HCE) 101", Aug. 1, 2014.
(Continued)

*Primary Examiner* — Mohammed Rachedine
(74) *Attorney, Agent, or Firm* — The Farrell Law Firm, P.C.

(57) ABSTRACT

Apparatus and method for managing connections of a plurality of devices by a Near Field Communication (NFC) Controller (NFCC) through NFC. The method includes setting identification information of an entity, the entity being requested from an NFC device for a connection with the NFC device; and setting a logical link between the NFC device and the entity based on the identification information.

20 Claims, 5 Drawing Sheets

(51) Int. Cl.
    *G06K 7/00* (2006.01)
    *G06K 7/10* (2006.01)
    *H04W 8/00* (2009.01)

(56) References Cited

U.S. PATENT DOCUMENTS

| | | |
|---|---|---|
| 2002/0132584 A1 | 9/2002 | Izumi |
| 2006/0276211 A1 | 12/2006 | Gallo |
| 2007/0145135 A1 | 6/2007 | Jogand-Coulomb et al. |
| 2007/0262134 A1 | 11/2007 | Humphrey et al. |
| 2007/0263595 A1 * | 11/2007 | Charrat ............... H04L 45/54 370/351 |
| 2007/0263596 A1 | 11/2007 | Charrat |
| 2008/0058104 A1 | 3/2008 | Nishida |
| 2008/0064346 A1 | 3/2008 | Charrat |
| 2008/0085001 A1 | 4/2008 | Charrat et al. |
| 2008/0092230 A1 | 4/2008 | Addy |
| 2008/0162312 A1 | 7/2008 | Sklovsky et al. |
| 2008/0207128 A1 | 8/2008 | Mikko |
| 2008/0288958 A1 * | 11/2008 | Ryoo ................. G06F 9/54 719/313 |
| 2009/0191811 A1 | 7/2009 | Griffin et al. |
| 2009/0206984 A1 | 8/2009 | Charrat et al. |
| 2009/0239512 A1 | 9/2009 | Hammad et al. |
| 2009/0239519 A1 | 9/2009 | Fujino |
| 2010/0227553 A1 | 9/2010 | Charrat et al. |
| 2010/0257238 A1 * | 10/2010 | Jeon .................. G06F 3/14 709/204 |
| 2014/0273839 A1 | 9/2014 | Naniyat et al. |

FOREIGN PATENT DOCUMENTS

| | | |
|---|---|---|
| CN | 101159008 | 4/2008 |
| EP | 1 898 592 | 3/2008 |
| JP | 2000122881 | 4/2000 |
| JP | 2007067723 | 3/2007 |
| JP | 2008-022533 | 1/2008 |
| JP | 2008-047094 | 2/2008 |
| JP | 2011-528886 | 11/2011 |
| KR | 1020020073276 | 9/2002 |
| KR | 1020080035313 | 4/2008 |
| KR | WO 2008048070 A2 * | 4/2008 ............... G06F 3/14 |
| KR | 1020080059277 | 6/2008 |
| WO | WO 2007/052696 | 5/2007 |
| WO | WO 2008/006958 | 1/2008 |
| WO | WO 2008/017745 | 2/2008 |
| WO | WO 2008048070 A2 * | 4/2008 ............... G06F 3/14 |

OTHER PUBLICATIONS

European Search Report dated Mar. 11, 2015 issued in counterpart application No. 09800536.6-1854.
U.S. Office Action dated Mar. 26, 2015 issued in counterpart U.S. Appl. No. 14/229,112.
Korean Office Action dated Aug. 18, 2015 issued in counterpart application No. 10-2011-7001892, 13 pages.
Japanese Office Action dated Nov. 16, 2015 issued in counterpart application No. 2015-054370, 10 pages.
Korean Office Action dated Feb. 26, 2016 issued in counterpart application No. 10-2011-7001892, 9 pages.
Japanese Office Action dated Aug. 1, 2016 issued in counterpart application No. 2015-054370, 4 pages.
Chinese Office Action dated Dec. 27, 2016 issued in counterpart application No. 201410538306.2, 18 pages.
Japanese Office Action dated Nov. 18, 2014 issued in counterpart application No. 2013-096210.
Chinese Office Action dated Jan. 12, 2015 issued in counterpart application No. 200980128405.0.
Gerald Madlmayr et al., "NFC Devices: Security and Privacy", The Third International Conference on Availability, Reliability and Security, IEEE Computer Society, 2008.
PCT/ISA/237 Written Opinion issued on PCT/KR2009/003957 (6 pp.).
PCT/ISA/210 Search Report issued on PCT/KR2009/003957 (4 pp.).

* cited by examiner

METHOD AND SYSTEM FOR MANAGING MULTIPLE APPLICATIONS IN NEAR FIELD COMMUNICATION

PRIORITY

This application is Continuation of U.S. patent application Ser. No. 13/055,045, which was filed in the U.S. Patent and Trademark Office on Jan. 20, 2011, as a National Phase Entry of PCT International Application No. PCT/KR2009/003957, which was filed on Jul. 17, 2009, and claims priority to Indian Patent Application No. 1760/CHE/2008, which was filed in the Indian Patent Office on Jul. 20, 2008, the entire content of each of which is incorporated herein by reference.

BACKGROUND OF THE INVENTION

1. Field of the Invention

The present invention, in general, relates to a field of managing data in short range wireless communication. More particularly, the present invention relates to a method and system for managing multiple applications in Near Field Communication (NFC).

2. Description of the Related Art

Communication devices such as mobile phone, Personal Digital Assistance (PDA), Laptops are frequently used for communication, for example, communication over a telecommunication network and short range communication. The communication over the telecommunication network can be a wired network and/or a wireless network. An example of wired network includes a Public Switched Telecommunication Network (PSTN). Examples of wireless network include Global System for Mobile (GSM), Code Division Multiple Access (CDMA), and the like. The short range communication can be established when communication devices are in a close proximity to each other. Examples of short range communication network include, but are not limited to Bluetooth, infrared communication, Near Field Communication, etc.

Near Field Communication (NFC) is a short-range high frequency wireless communication technology. In NFC a communication link is established automatically as soon as two NFC enabled communication devices are placed close to each other. NFC enables exchange of data between devices that are within ~10 centimeter distance. NFC compatible communication devices adheres to ISO 18092 standards. Further, NFC compatible communication devices can operate in different operating modes, for example, reader/writer mode, peer-to-peer mode, and card emulation mode. The different operating modes are based on ISO/IEC 18092-NFCIP-1 and ISO/IEC 14443 contactless smart card standards. For the sake of clarity and for the purpose of this description, the NFC compatible communication devices will be referred as communication devices.

In reader/writer mode, the communication device is capable of reading NFC forum mandated tag types. A tag in this mode is either active or passive. However, the tag is activated for communication when a reader communication device is at a close proximity to the tag. In Card Emulation mode, the communication device hosts a NFC tag that is used as a traditional contactless smart card. In the Peer to Peer mode of operation, a legacy NFC communication device works in a Half-Duplex mode of operation using protocols that enable Peer to Peer mode of operation.

Hence, the NFC communication devices operate in three different modes. The main parts of a NFC communication device operation include NFC Controller (NFCC), Device Host (DH), and removable entities. An example of DH includes a processor. The removable entities include secure elements (SE) and/or non-secure elements. The NFCC interfaces and interacts with the DH and the removable entities directly through physical links. The interactions are managed by the protocols in the NFCC, DH and removable entities. Hence, the interaction among the NFCC, the DH and the removable entities results in transfer of application data over the NFC wireless link. In NFC communication devices, multiple applications can be deployed on DH and removable entities. Further the interaction of the multiple applications with other applications entities within the same NFC communication device and also with other NFC communication devices is managed by the NFCC.

SUMMARY OF THE INVENTION

The present invention has been made to address at least the above problems and/or disadvantages and to provide at least the advantages described below.

Accordingly, an aspect of the present invention is to provide a method and system to efficiently manage operations associated with multiple applications in the NFCC.

In accordance with an aspect of the present invention, a method is provided for managing connections of a plurality of devices by a Near Field Communication (NFC) Controller (NFCC) through NFC. The method includes setting identification information of an entity, the entity being requested from an NFC device for a connection with the NFC device; and setting a logical link between the NFC device and the entity based on the identification information.

In accordance with an aspect of the present invention, a Near Field Communication (NFC) Controller (NFCC) is provided for managing connections of a plurality of devices through NFC. The NFCC includes a processor configured to set identification information of an entity, the entity being requested from an NFC device for a connection with the NFC device, and set a logical link between the NFC device and the entity based on the identification information, and a memory configured to store the identification information.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

In the accompanying figures, similar reference numerals may refer to identical or functionally similar elements. These reference numerals are used in the detailed description to illustrate various embodiments and to explain various aspects and advantages of the present disclosure.

Persons skilled in the art will appreciate that elements in the figure is illustrated for simplicity and clarity and may have not been drawn to scale. For example, the dimensions of some of the elements in the figure may be exaggerated relative to other elements to help to improve understanding of various embodiments of the present disclosure.

The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are no where intended to represent a chronological order, as and where stated otherwise. A set is defined as a non-empty set including at least one element.

Figure 1:
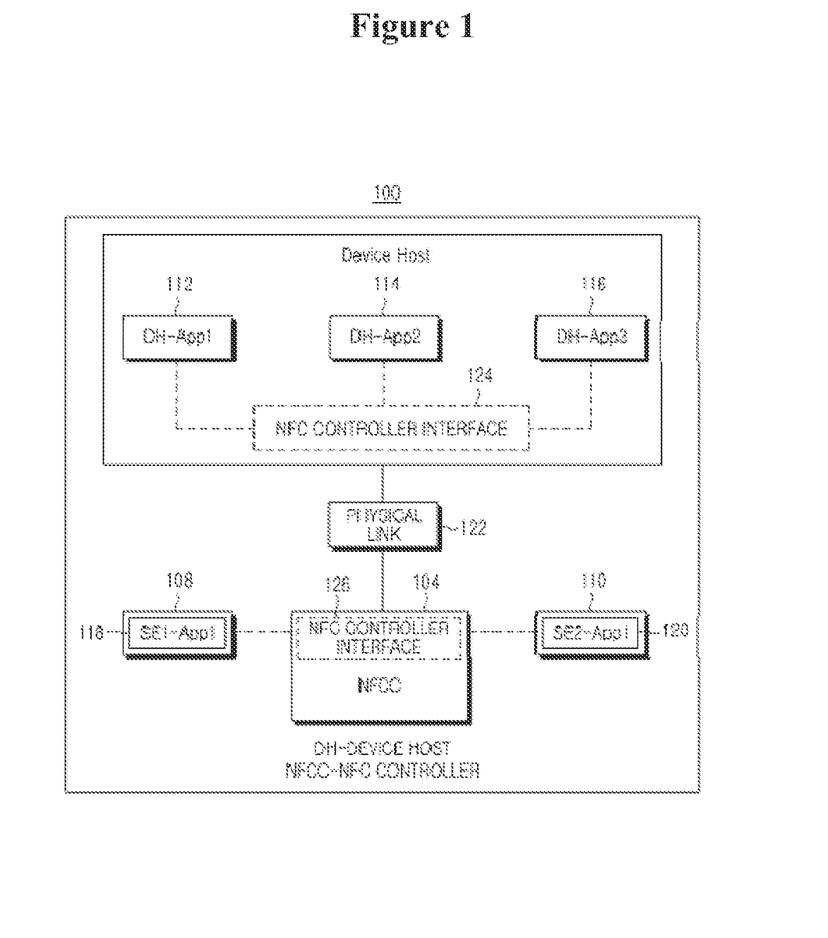
FIG. 1 illustrates an exemplary environment, in accordance with one embodiment of the present invention.

FIG. 1 illustrates an exemplary environment 100 in accordance with one embodiment of the present invention. The environment 100 includes a NFC device 102. The NFC device 102 is shown to include a Near Field Communication Controller (NFCC) device 104, a Device Host (DH) 106, two secure elements (SE1 and SE2) 108 and 110. The DH is associated with three applications, for example an application 112 (DH-App1 112), an application 114 (DH-App2 114) and an application 116 (DH-App3 116). The two secure elements are also associated with one NFC applications each, for example an application 118 (SE1-App1) and an application 120 (SE1-App2). However, only two secure elements and one DH are shown in the environment 100, it will be apparent to the person ordinarily skilled in the art that the environment 100 includes more number of secure elements and DH. Further, the number of applications associated with the DH and secure elements may also vary.

For NFC communication, the applications in the DH 106 and the secure elements 108 and 110, interact and communicate initially with the NFCC 104 in the NFC device 102. For example, the DH 106 is connected to the NFCC 104 using a physical link 122. In an embodiment, the applications residing in the DH 106 and the SE s (108 and 110) interact with NFCC using one or more NFC Controller Interface, For example NFC Controller interface 124 and 126. The NFC communication can be internal communication and/or external communication. The internal communication includes interaction between one or more elements within the same NFC device. For example in the NFC device 102, the internal communication is when an application in the DH 106 communicates with an application in the secure element 108 and/or the secure element 110 and/or vice versa.

The external communication is when applications residing in an element in one NFC device interact with an application residing in an element in another NFC device. For example in the environment 100, the external operation is when an application in the DH 106 and/or secure element 108 and/or 110 interacts with an application residing in an element in a remote NFC device. The applications residing in the DH 106 and Secure Element (SE) 108 and 110 communicates with applications residing in other NFC devices using the NFCC 104, the NFCC 104 in turns uses NFC air interface for communication. This results in application data transfer over the NFC wireless link.

In an embodiment, the data transfer associated with a plurality of applications is managed by the protocols in the NFCC 104. The plurality of applications associated with the DH 106 and secure elements 108 and 110 are managed by the NFCC 104 by creating logical links. In an embodiment, a logical link is used to identify a communication path between the NFCC 104 and the applications residing in the DH, SE or with a remote NFC device. The interaction between the NFCC 104 and the DH 106 and the interaction between the NFCC 104 and the SE s 108 and 110 occurs inside an NFC device 102. Hence, the NFCC 104 manages operations associated with a plurality of applications residing in the DH 106, the SE 108 and the SE 110 by maintaining and storing a plurality of information associated with each application in the NFCC 104.

In an embodiment, information associated with the plurality of applications are Source Host Identity (ID), Destination Host ID and a link ID associated with each of the applications associated with DH and SE, for example the DH 106 and the SE s 108 and 110. The Source Host Id is the identity of a source element in which an application that has requested communication is residing. The Destination Host ID is an identity of a destination element with which the application has requested to communicate. The logical link identity (ID) is a unique connection identity that is created when a link between an application and the NFC controller is established.

For example, when DH-App1 interacts with SE1-App1, the Source Host ID is the ID of the DH 104, the destination Host ID is the ID of the SE 108 and link ID is a unique connection identity that will be generated when a link will be established between the DH 104 and the SE 108. Similarly, information associated with a plurality of application interactions is stored in the NFCC 104. Thereby, the NFCC 104 manages the plurality of operations associated with application in the NFC device.

Figure 2:
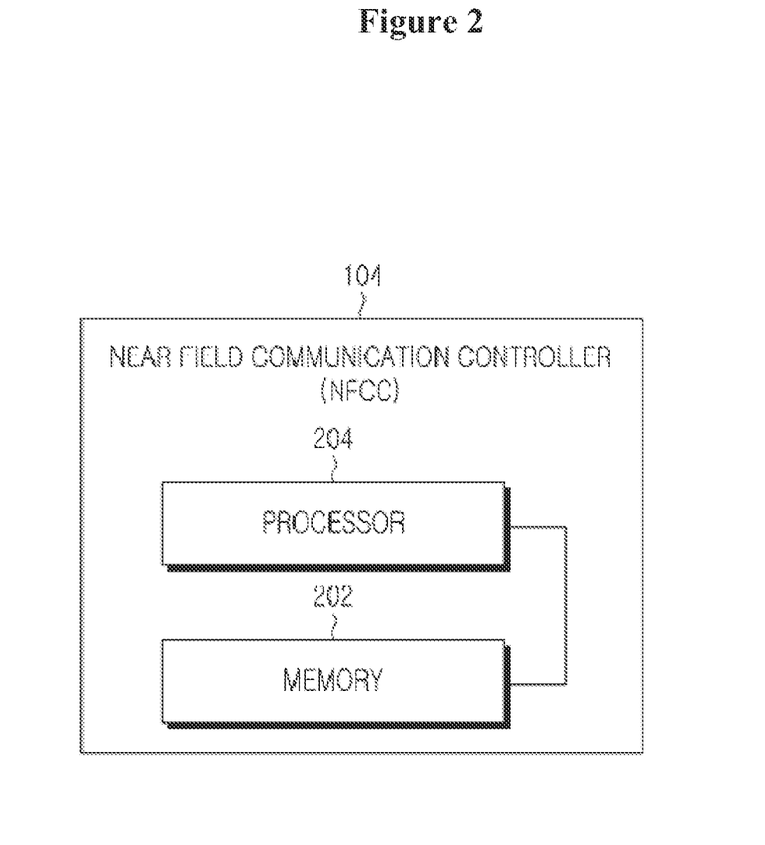
FIG. 2 illustrates a Near Field Communication Controller (NFCC), in accordance with one embodiment of the present invention.

FIG. 2 illustrates a Near Field Communication Controller (NFCC) 104 in accordance with one embodiment of the present invention. To explain the FIG. 2, references will be made to FIG. 1. However, it will be apparent to a person ordinarily skilled in the art that the present invention can be explained with the help of any other suitable embodiment of the present invention. The NFCC 104 includes a memory 202 and a processor 204. The memory 202 is capable of storing a source host identity (ID), a destination host ID and a link ID associated with each application from one or more applications.

In the environment 100, the memory 202 is capable of storing information associated with the applications residing in the DH 106, the SE 108 and the SE 110, when the applications interact with each other or with applications residing at remote device. For example the memory 202 stores information associated with applications DH-App1, DH-App2, DH-App3, SE-App1 and SE-App2, when the applications interact with each other or applications residing at remote device. For example, when DH-App1 interacts with SE1-App1, the source host ID, the destination host ID and the link ID associated with the communication is stored in the memory 202.

In an embodiment, a source Host ID, a destination host ID and a link ID, associated with one or more applications, is stored collectively and simultaneously when the one or more applications interacts with other applications. Further, the processor 204 manages operations associated with the one or more applications simultaneously based on the source host ID, the destination host ID and the link ID stored in the NFCC.

Figure 3:
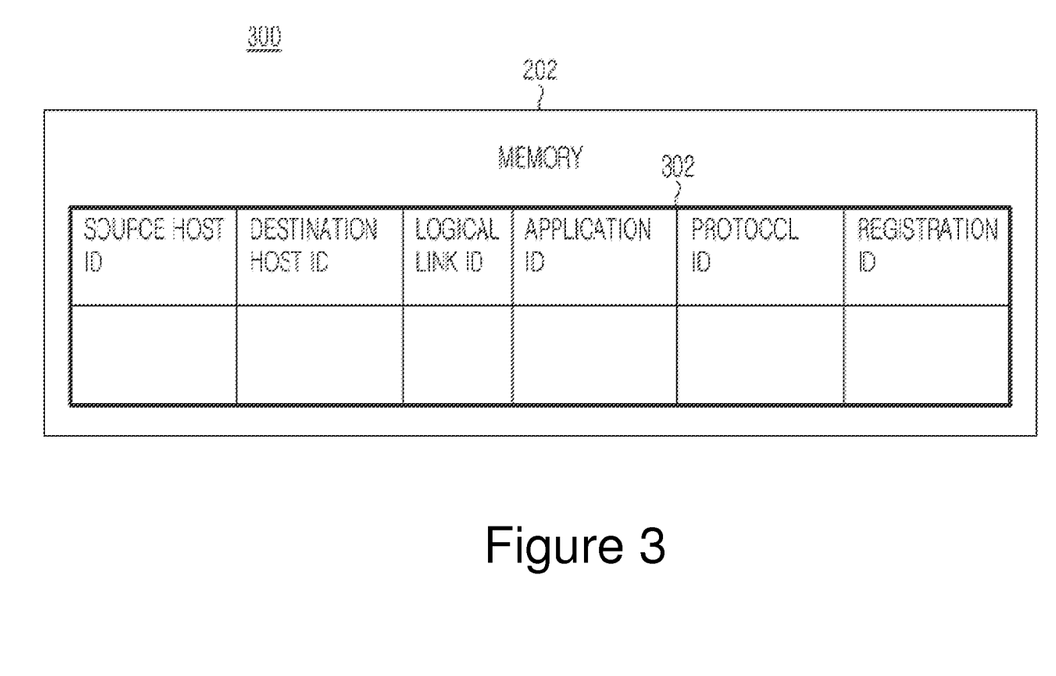
FIG. 3 illustrates representation of data stored in a memory in accordance with one embodiment of the present invention.

FIG. 3 illustrates a representation of data stored in a memory in accordance with one embodiment of the present invention. To explain the FIG. 3, references will be made to FIG. 1 and FIG. 2. However, it will be apparent to a person ordinarily skilled in the art that the present invention can be explained with the help of any other suitable embodiment of the present invention.

The environment 300 shows a memory 202 associated with the NFCC 104. In an embodiment, the memory 202 stores information associated with one or more applications when the one or more applications communicate with other applications. In an embodiment, the memory 202 stores a source host ID, a destination host ID and a link ID associated with each of the one or more application, when the one or more application is interacting with other applications. In another embodiment, the memory 202 stores any of a source Host ID, a destination host ID, a link ID, an application ID, a protocol ID, or a registration ID associated with each of the one or more applications.

Hence, when an application, for example a DH application 112 (the DH-App1) communicates with other applications, for example the SE-App1, a source host ID, a destination host ID, a link ID, an application ID or a protocol ID associated with the application DH-App1 is stored in the memory 202. For example, the source host ID is the identity of the DH 106, the destination host ID is the identity of the SE 108, the link ID will be a logical link ID that will be generated when a link is created with the NFCC 104.

In an embodiment, the application ID identifies an application with a unique identifying mechanism. The application ID is a predefined identifier set by NFC standards or it can be defined as a new identifier for NFC applications. The Protocol ID identifies a protocol with a unique identifying mechanism. The protocol ID is a predefined identifier set by NFC standards or it can be defined as a new identifier for NFC protocols that are operating in the NFCC or using the NFC Controller Interface. The registration ID is required to securely identify a removable element such as a Secure Element or any other removable element. This ID is created when the secure element or a non-secure element is inserted in a NFC device for the first time after authentication a procedure occurs.

In an embodiment, the information associated with the one or more applications that are communicating is stored in a tabular format 302 in the memory 202. The tabular format 302 shows five different fields, for example a Source Host ID field, a Destination Host ID field, a Link ID field, an Application ID field and a Protocol ID field. Though six fields are shown in FIG. 3, it no where limits the scope of the invention to six fields. Hence, a person ordinary skilled in the art can have more or less number of fields in the memory 202. Further, the method can also be performed with more or less number of fields.

Figure 4:
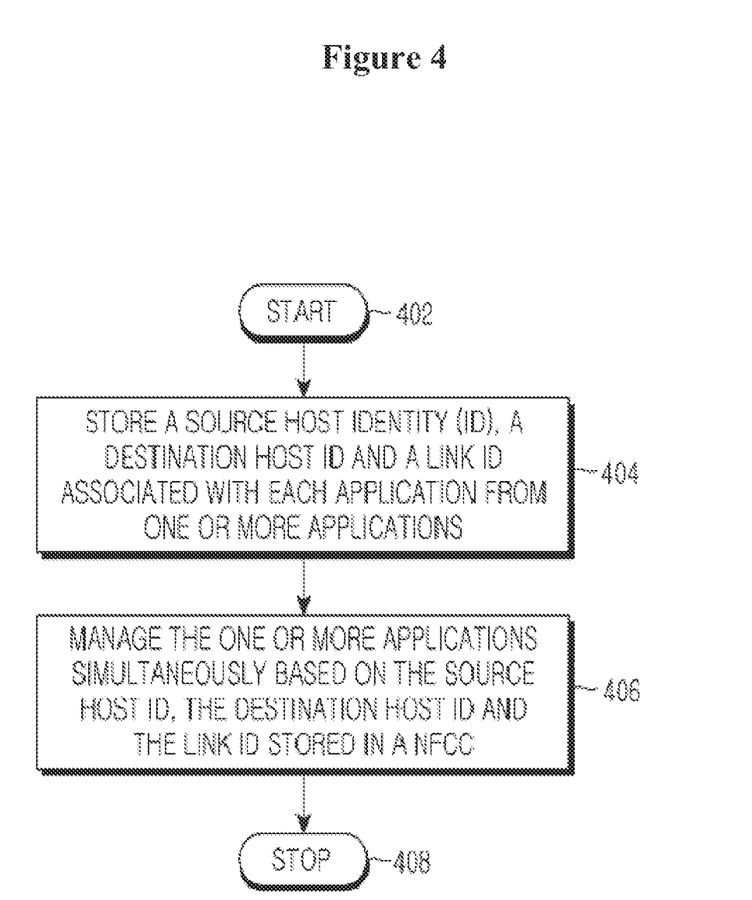
FIG. 4 illustrates a method for handling operations associated with a plurality of applications in a Near Field Communication Controller (NFCC), in accordance with one embodiment of the present invention.

FIG. 4 illustrates a method for handling operations associated with plurality of applications in a Near Field Communication Controller (NFCC), in accordance with one embodiment of the present invention. To explain the method 400, references will be made to FIG. 1. However, it will be apparent to a person ordinarily skilled in the art that the present invention can be explained with the help of any other suitable embodiment of the present invention. The method 400 can also include more number of steps as depicted in FIG. 4. Further, the order of the steps may also vary. In an embodiment, the method is performed by the NFCC.

At step 402 the method 400 is initiated. At step 404, the method 400 stores a source host identity (ID), a destination host ID and a link ID associated with each application from the one or more applications. In an embodiment, the source host ID, the destination host ID and the link ID is stored in the memory 202 when an application residing in an element interacts with other applications. For example, when the DH-App1 communicates with the SE-App1 and DH-App2 communicates with the SE-App2, the information associated with the communication is stored in the memory 202 of the NFCC 104. In an embodiment, the information associated with the communication is a source host ID, a destination host ID and a link ID.

In an embodiment, the source host ID is the ID of the entity where an initiating application resides. The initiating application is an application that initiates a communication. Hence, identity of the DH 106 is the source host ID when the DH-App1 initiates communication with other applications. In an embodiment, the destination host ID is the ID of the entity where a requested application resides. The requested application is an application which is requested by the initiating application for communication. For example, when the DH-App1 communicates with the SE-App1 then the destination host ID is the ID of the Secure Element 108.

In an embodiment, the link ID is a logical link ID that is generated when the communication between the entities within the same electronic device is established. For example, when the DH-App1 communicates with the SE-App1 then the link ID is the logical link ID that is generated at run time. In another embodiment, when an application, for example the DH-App1 communicates with an application residing in other NFC device then the logical link ID is a predefined ID. Hence, the NFCC stores the predefined ID as the link ID when the application in the source host interacts with a destination host over a NFC air interface.

At step 406, the method 400 manages the one or more applications simultaneously based on the source host ID, the destination host ID and the link ID stored in the NFCC. In an embodiment, the method manages communication associated with the one or more applications in the NFC device 102 simultaneously. In an embodiment, the one or more applications are stored in a Device Host (DH). In an embodiment, the one or more applications are stored in a removable elements associated with the NFC device. In an embodiment, the one or more applications are stored in DH and/or removable elements or both. The removable elements are secure element and/or a non-secure element.

In an embodiment, the method 400 also stores a registration ID along with the source host ID, destination host ID and link ID. In an embodiment, the registration ID is stored when an application, that is initiating the communication, is residing in a removable element. The removable element is an entity that can be connected and disconnected from an NFC device. In an embodiment, an application in a removable element registers itself with the NFC device when the removable element is connected with the NFC device.

Thereafter, a registration ID is generated when the device is successfully connected and identified by the NFCC. Hence, the method 400 then manages the one or more applications based on the registration ID along with the source host ID, destination host ID and link ID. In an embodiment, each of the one or more applications interacts with NFCC using a predefined dedicated link when the communication is within the NFC device. In this embodiment, the one or more applications are residing in one or more Secure Elements (SE) associated with the NFC device. The predefined link is used to transport the command, events or data of one or more applications to the Device Host. In an embodiment, the predefined dedicated link is created when the NFCC is initialized.

The predefined dedicated link, for example a Routing_SE_Link or a Tunnel_SE_Link, can be pre-allocated in the NFCC 104 for the purpose of routing data from the one or more SE (108 and 110) to the DH 106. For example, a link ID OxFF can be pre-allocated in the NFCC 104 to handle routing of traffic from one or more SE (108 and 110) to the DH 106. This link can be pre-established between the NFCC 104 and DH 106 while the NFCC is initialized.

In an embodiment, the applications that are residing in one or more SE can communicate to the NFCC and the peer device over NFC interface only. Hence, there can be message exchanges required between the SE and the DH. Therefore, the NFCC creates the dedicated link, for example the Routing_SE_Link or the Tunnel_SE_Link, that can be used to carry data frames or other information frame from one or more SE to the DH. In an embodiment, the frames carry necessary information like Application ID, SE_ID that is required by the DH to act on the data carried in the frame.

In an embodiment, the method 400 stores a protocol ID along with the source host ID, destination host ID and link ID. The protocol ID is the ID associated with a protocol that is used by an application, for example DH-App1, to communicate with other application, for example the SE-App1. In this embodiment, the method manages the one or more applications simultaneously based on the source host ID, the destination host ID, the link ID and the protocol ID.

In an embodiment, the method 400 stores an application ID along with the source host ID, destination host ID and link ID. The application ID is the ID that associated with an application when the NFCC identifies and initializes the application, for example DH-App1. In this embodiment, the method manages the one or more applications simultaneously based on the source host ID, the destination host ID, the link ID and the application ID.

In an embodiment, the method stores at least one of a source host identity (ID), a destination host ID, a link ID, an application ID, a registration ID or a protocol ID associated with each application from one or more applications. For example, the method 400 can store only application ID and protocol ID associated with one or more applications. In another example, the method 400 can store only a link ID and source ID associated with one or more applications. Thereafter, the method manages the one or more applications simultaneously based on at least one of a source host ID, a destination host ID, a link ID, an application ID, a registration ID or a protocol ID stored in the NFCC.

In an embodiment, the method manages one or more applications in the NFC device when the data associated with the one or more applications are sent to an applications residing in an elements in the same NFC device and/or to an application residing in a second NFC device. In another embodiment, the method manages one or more applications in the NFC device when the data associated with the one or more applications are being received from an applications residing in an elements in the same NFC device and/or to an application residing in a second NFC device. At step 408, the method 400 is terminated.

Figure 5:
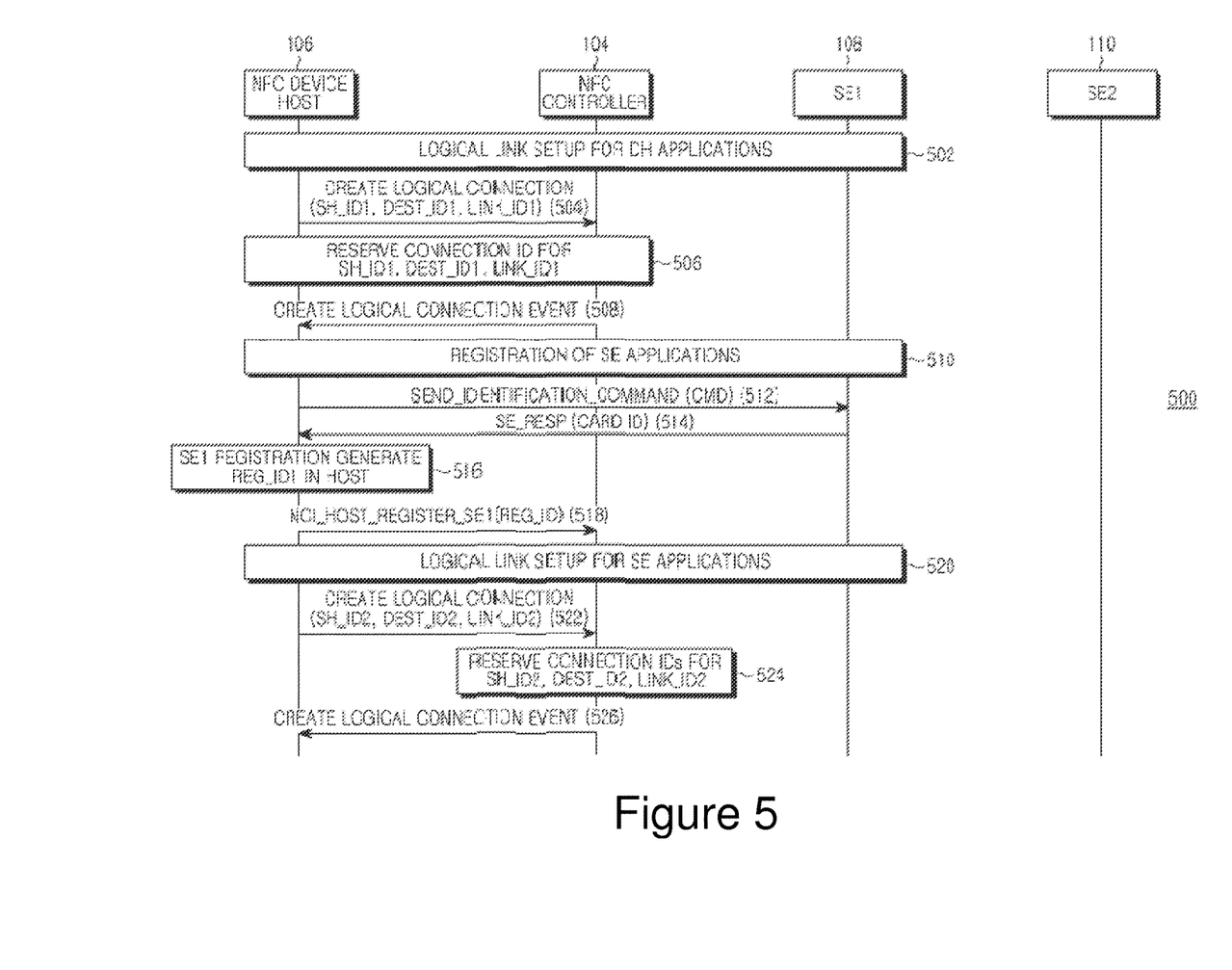
FIG. 5 illustrates a flow diagram for handling operations associated with plurality of applications in a Near Field Communication Controller (NFCC), in accordance with one embodiment of the present invention.

FIG. 5 illustrates a flow diagram 500 for handling operations associated with plurality of applications in a Near Field Communication Controller (NFCC), in accordance with one embodiment of the present invention. To explain the flow diagram 500, references will be made to FIG. 1 and FIG. 2. However, it will be apparent to a person ordinarily skilled in the art that the present invention can be explained with the help of any other suitable embodiment of the present invention. The flow diagram 500 can also include more or less number of steps as depicted in FIG. 5. Further, the order of the steps may also vary. In an embodiment, the method is performed by the communication device.

At step 502, an application residing at Device Host (DH), for example the DH 106, request the NFC Controller (NFCC) 104 to establish a communication session with other application, for example SE-App1. Hence, initiation of a logical link setup happens at step 502. At step 504, the NFCC creates a logical connection and updates one or more fields in the memory 202 of the NFCC 104 with information associated with a logical connection. Hence, information associated a source host ID, a destination host ID and a link ID is stored in the memory 202 of the NFCC 104. For example, ID of the DH 106 is stored as a source ID and ID of the SE 108 is stored as the destination ID when the DH-App1 communicates with the SE-App1.

In an embodiment, an ID associated with a created logical link between the DH-App1 and SE-App1 is also stored in the NFCC 104. In an example, the ID of the DH 106 is SH_ID1, the ID of the SE 110 is DEST_ID1 and the logical link ID is a link_ID1. At step 506, a connection ID is reserved for the connection associated with the application, for example the connection ID is reserved for SH_ID1, DEST_ID1 and link_ID1. At step 508, a logical connection event is created. At step 510, SE applications are registered with the NFC device. In an embodiment, the SE applications are registered when a removable device is attached to the NFC device. At step 512, the DH 106 sends an identification command to the secure elements for identifying the secure elements. In an embodiment, the identification command is sent using a function Send_Identification_Command (CMD) as shown in FIG. 5.

At step 514, the secure element responds to the DH 106 with the Secure Element card identity. For example, the secure element sends a response using a function SE_Resp (Card_ID). At step 516, the secure element gets registered. Further, a registration ID is generated in the DH 106. For example registration ID is Reg_ID1.

At step 518, the NFC Controller Interface (NCI) registers the secure element SE1. In an embodiment, the NCI registers the secure element using function NCI_Host_Register SE1(REG_ID1). At step 520, a logical link setup is initiated when an application residing in the secure element (SE1) communicates with other applications. At step 522, a logical connection is created. In an embodiment, the logical connection is created using the function Create Logical Connection (SH_ID2, DEST_ID2, link_ID2)). At step 524, a connection ID is reserved for the logical connection associated with SH_ID2, DEST_ID2 and link_ID2. At step 526, a logical connection event is created for the application residing at the SE1.

In an embodiment, the source host ID, the destination host ID and the link ID associated with one or more applications in the NFC device are stored in the NFCC 104. This is done when the one or more applications interact with other applications residing in the same NFC device or with an application residing in other NFC device. Thereafter, the operations associated with the one or more applications are managed based on the information stored in the NFCC. In an embodiment, an application ID, a protocol ID or a registration ID is also stored in the NFCC.

Various embodiments of the present invention described above provide the following advantages. The present invention provides a method for managing operations associated with multiple applications in a Near Field Communication (NFC) device. The method increases the efficiency of the NFC device as the information associated with a plurality of applications that are communicating with other applications are stored in the NFC Controller (NFCC). Hence, the NFCC can easily manage multiple applications simultaneously.

The method enables the NFC device to perform lesser operations for managing multiple applications. This increases performance of the NFC device and also reduces power consumption considering NFC operations are power critical. The usage of Registration ID enhances the security features. Further, the discovery operations are also eased out by the usage of Protocol ID.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method for managing, by a Near Field Communication Controller (NFCC), connections between a plurality of entities through Near Field Communication (NFC), the method comprising:
   receiving a request, from a Device Host (DH), for information on entities connected with the NFCC;
   allocating identification information corresponding to each of the entities connected with the NFCC;
   transmitting at least portion of the identification information to the DH;
   receiving a request for connecting with at least one entity from the DH;
   setting at least one logical connection between the DH and the at least one entity; and
   transmitting logical connection information on the at least one logical connection to the DH,
   wherein, when a connection between a removable entity and the NFCC is detected by the NFCC, registration ID is allocated, by the NFCC, to the removable entity connected to the NFCC.

2. The method of claim 1, wherein the identification information includes a source host IDentifier (ID) of each of the at least one entity, a destination host ID of each of the at least one entity, a link ID of each of the at least one logical connection between the DH and the at least one entity, or the registration ID.

3. The method of claim 2, wherein setting the at least one logical connection between the DH and the at least one entity comprises:
   assigning the link ID to each of the at least one logical connection between the DH and the at least one entity.

4. The method of claim 2, further comprising setting, by the DH, a link between the DH and the NFCC.

5. The method of claim 4, wherein the link ID is set for identifying the link between the DH and the NFCC, and is valid while the link is maintained.

6. The method of claim 5, wherein, when the link between the DH and the NFCC is terminated, the link ID is used to identify another link between another DH and the NFCC.

7. The method of claim 4, wherein receiving the request for connecting with the at least one entity from the DH comprises:
   receiving a request for initiating a communication session for the at least one logical connection from the DH.

8. The method of claim 1, wherein receiving the request for the information on the entities connected with the NFCC comprises:
   receiving a discovery command for discovering the entities connected with the NFCC from the DH.

9. The method of claim 8, wherein transmitting the at least portion of the identification information to the DH comprises transmitting a discovery response corresponding to the discovery command to the DH, and
   wherein the discovery response includes information indicating current statuses of the entities connected with the NFCC, protocols supported by the entities connected with the NFCC, and a number of the entities connected with the NFCC.

10. The method of claim 8, wherein a source host IDentifier (ID) is an identifier corresponding to each of the entities connected with the NFCC.

11. A Near Field Communication Controller (NFCC) for managing connections between a plurality of devices through Near Field Communication (NFC), the NFCC comprising:
   an NFC controller interface configured to receive a request, from a Device Host (DH), for information on entities connected with the NFCC;
   a processor configured to:
      allocate identification information to each of the entities connected with the NFCC,
      control the NFC controller interface to transmit at least portion of the identification information to the DH,
      control the NFC controller interface to receive, from the DH, a request for connecting with at least one entity,
      set at least one logical connection between the DH and the at least one entity, and
      control the NFC controller interface to transmit, to the DH, logical connection information on the at least one logical connection; and
   a memory configured to store the identification information corresponding to each of the entities connected with the NFCC,
   wherein the processor is further configured to, when a connection between a removable entity and the NFCC is detected by the NFCC, allocate a registration ID to the removable entity connected to the NFCC.

12. The NFCC of claim 11, wherein the identification information includes a source host IDentifier (ID) of each of the at least one entity, a destination host ID of each of the at least one entity, a link ID of each of the at least one logical connection between the DH and the at least one entity, or the registration ID.

13. The NFCC of claim 12, wherein the processor is further configured to assign the link ID to each of the at least one logical connection between the DH and the at least one entity.

14. The NFCC of claim 12, wherein the DH sets a link between the DH and the NFCC.

15. The NFCC of claim 14, wherein the link ID is set for identifying the link between the DH and the NFCC, and is valid while the link is maintained.

16. The NFCC of claim 15, wherein, when the link between the DH and the NFCC is terminated, the link ID is used to identify another link between another DH and the NFCC.

17. The NFCC of claim 14, wherein the processor is further configured to receive a request for initiating a communication session for the at least one logical connection from the DH through the NFC controller interface.

18. The NFCC of claim 11, wherein the processor is further configured to receive a discovery command for discovering the entities connected with the NFCC from the DH through the NFC controller interface.

19. The NFCC of claim 18, wherein the processor is further configured to control the NFC controller interface to transmit a discovery response corresponding to the discovery command to the DH, and wherein the discovery response includes information indicating current statuses of the entities connected with the NFCC, protocols supported by the entities connected with the NFCC, and a number of the entities connected with the NFCC.

20. The NFCC of claim 18, wherein a source host IDentifier (ID) is an identifier corresponding to each of the entities connected with the NFCC.

* * * * *